United States Patent
Yamazaki et al.

(10) Patent No.: US 10,636,391 B2
(45) Date of Patent: Apr. 28, 2020

(54) ELECTRONIC LABEL SYSTEM INCLUDING CONTROL DEVICE FOR CONTROLLING ELECTRONIC LABELS

(71) Applicant: TOSHIBA TEC KABUSHIKI KAISHA, Tokyo (JP)

(72) Inventors: Keita Yamazaki, Mishima Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/820,591

(22) Filed: Nov. 22, 2017

(65) Prior Publication Data
US 2018/0166046 A1 Jun. 14, 2018

(30) Foreign Application Priority Data

Dec. 9, 2016 (JP) ................................. 2016-239375

(51) Int. Cl.
| | |
|---|---|
| *G09G 5/38* | (2006.01) |
| *G06F 3/14* | (2006.01) |
| *G06Q 30/02* | (2012.01) |
| *G09G 5/00* | (2006.01) |
| *G06F 3/147* | (2006.01) |

(52) U.S. Cl.
CPC ................. *G09G 5/38* (2013.01); *G06F 3/14* (2013.01); *G06F 3/147* (2013.01); *G06F 3/1431* (2013.01); *G06Q 30/02* (2013.01); *G09G 5/00* (2013.01); *G09G 2370/042* (2013.01); *G09G 2370/16* (2013.01); *G09G 2380/04* (2013.01)

(58) Field of Classification Search
CPC .... G09G 5/00; G09G 5/38; G06F 3/14; G06F 3/147; G06F 3/1431; G06Q 30/02; A47F 5/00
USPC ................... 345/1.1, 156; 455/557; 235/385; 705/14.55, 28
See application file for complete search history.

(56) References Cited

U.S. PATENT DOCUMENTS

| | | | | |
|---|---|---|---|---|
| 3,225,177 | A * | 12/1965 | Stites ................... | C10M 175/00 235/454 |
| 8,688,517 | B2 * | 4/2014 | Lutnick .................. | G06Q 30/02 705/14.4 |
| 8,695,872 | B2 * | 4/2014 | Braunstein .............. | G07F 9/026 235/379 |

(Continued)

FOREIGN PATENT DOCUMENTS

CN 101728628 * 6/2013 ............... H01Q 1/22

*Primary Examiner* — Prabodh M Dharia
(74) *Attorney, Agent, or Firm* — Kim & Stewart LLP (57) ABSTRACT

A control device controls electronic labels in an electronic label system. The control device includes a first interface that acquires a captured image in which a commodity is included. A second interface transmits display information to an electronic label. A processor identifies, based on a captured image received via the first interface, the commodity and the position of the commodity. The processor determines a display position on an electronic label for displaying commodity information relating to the commodity based on the position of the commodity, and generates display information including the display position and a display content based on the identified commodity and the display position. The processor transmits the generated display information to the electronic label via the second interface.

18 Claims, 6 Drawing Sheets

(56) References Cited

U.S. PATENT DOCUMENTS

| | | | | |
|---|---|---|---|---|
| 2002/0165007 A1* | 11/2002 | Gawne | ............... | G06K 17/0022 |
| | | | | 455/557 |
| 2009/0094140 A1* | 4/2009 | Kwan | ................. | G06Q 10/087 |
| | | | | 705/28 |
| 2010/0065634 A1* | 3/2010 | Nakamura | ......... | G06Q 30/0603 |
| | | | | 235/385 |
| 2011/0123198 A1* | 5/2011 | Nilsson | ................. | G06F 3/147 |
| | | | | 398/108 |
| 2012/0169585 A1* | 7/2012 | Kim | ...................... | G06Q 30/06 |
| | | | | 345/156 |
| 2013/0325533 A1* | 12/2013 | Shin | ....................... | G06Q 30/06 |
| | | | | 705/7.12 |
| 2014/0019311 A1* | 1/2014 | Tanaka | ................. | G06Q 10/083 |
| | | | | 705/27.2 |
| 2014/0365281 A1* | 12/2014 | Onischuk | ............... | G07C 13/00 |
| | | | | 705/12 |
| 2015/0156257 A1* | 6/2015 | Li | ......................... | H04L 67/303 |
| | | | | 709/201 |
| 2015/0199942 A1* | 7/2015 | Mochizuki | ............ | G06F 3/1431 |
| | | | | 345/531 |
| 2015/0317682 A1* | 11/2015 | Kayser | ............... | G01G 19/4144 |
| | | | | 705/14.55 |
| 2016/0171456 A1* | 6/2016 | Bowles | .................. | G06Q 10/30 |
| | | | | 705/23 |
| 2016/0379367 A1 | 12/2016 | Yasunaga | | |
| 2017/0103515 A1* | 4/2017 | Hulth | ................. | G06K 17/0022 |

\* cited by examiner

ELECTRONIC LABEL SYSTEM INCLUDING CONTROL DEVICE FOR CONTROLLING ELECTRONIC LABELS

CROSS-REFERENCE TO RELATED APPLICATION

This application is based upon and claims the benefit of priority from Japanese Patent Application No. 2016-239375, filed Dec. 9, 2016, the entire contents of which are incorporated herein by reference.

FIELD

Embodiments described herein relate generally to an electronic label system including a control device for controlling electronic labels, and a display control method.

BACKGROUND

An electronic shelf label displays, for example, a price of a commodity. The electronic shelf label is disposed on a commodity shelf where the commodities are arranged and displays the price of the nearby commodity. The content and display position of the electronic shelf label are controlled by a display control device connected to the electronic shelf label.

The display control device controls the content and the display position of the electronic shelf label according to an operator's input. However, the display control device has a problem in that there is a possibility that a display error may occur due to the operator's input error.

DETAILED DESCRIPTION

Embodiments provide a display control device and a display control method that prevents display error.

According to an embodiment, a control device controls electronic labels in an electronic label system. The control device includes a first interface that acquires a captured image in which a commodity is included. A second interface transmits display information to an electronic label. A processor identifies, based on a captured image received via the first interface, the commodity and the position of the commodity. The processor determines a display position on an electronic label for displaying commodity information relating to the commodity based on the position of the commodity, and generates display information including the display position and a display content based on the identified commodity and the display position. The processor transmits the generated display information to the electronic label via the second interface.

Hereinafter, embodiments of the present exemplary embodiment will be described with reference to the drawings.

First Embodiment

First, the first embodiment will be described.

In the electronic label system according to the embodiments, information (e.g., commodity information) on each of a plurality of commodities arranged on the commodity shelf is displayed on a display device provided in the vicinity of each respective commodity. For example, in the electronic label system, a display device, such as an electronic label, for displaying the price or the like of the commodity is arranged at the base of the position where the commodity is arranged. In the electronic label system, the commodity information is displayed on the display device, which may be an electronic shelf label installed in the vicinity of the respective commodity on the commodity shelf.

Figure 1:
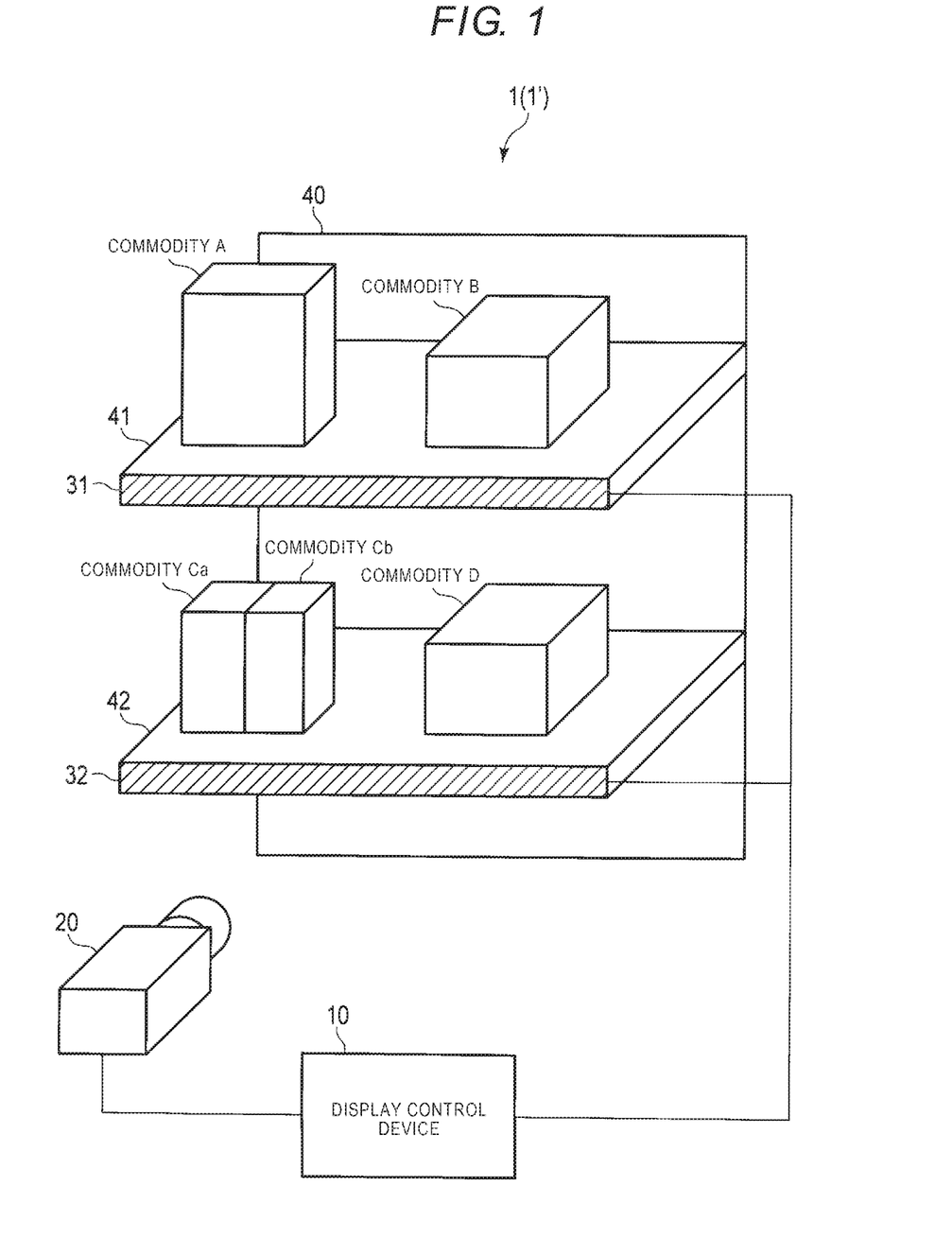
FIG. 1 is a diagram illustrating an example of an electronic label system.

FIG. 1 is a diagram illustrating an example of an electronic label system 1.

As illustrated in FIG. 1, the electronic label system 1 includes a display control device 10, a camera 20, electronic shelf labels 31 and 32, and a commodity shelf 40. The electronic label system 1 may include other components in addition to the configuration illustrated in FIG. 1, if necessary, or may exclude specific elements.

The display control device 10 controls the commodity information and the display position of the commodity information displayed in the electronic shelf labels 31 and 32. The display control device 10 is connected to the camera 20 and the electronic shelf labels 31 and 32. The display control device 10 controls the commodity information and the display position of the commodity information displayed on the electronic shelf labels 31 and 32 based on an image captured by the camera 20. The display control device 10 will be described in detail below.

The commodities are arranged on the commodity shelf 40. The commodity shelf 40 includes shelves 41 and 42. The shelf 41 is located at a predetermined position on the commodity shelf 40. The shelf 42 is located at a predetermined position below the shelf 41.

The commodity shelf 40 stores a commodity A, a commodity B, a commodity C (Ca and Cb), and a commodity D. In the example illustrated in FIG. 1, the commodities A and B are arranged on the shelf 41 with the first side of each package aligned and facing a customer. The commodity C and the commodity D are arranged on the shelf 42 with the first side of the each package aligned and facing a customer. Two commodities C are arranged next to each other as the commodities Ca and Cb.

The camera 20 captures an image of the commodity shelf 40. For example, the camera 20 is positioned where the images of the commodity shelf 40 and the commodities A to D arranged on the commodity shelf 40 can be imaged. In the example illustrated in FIG. 1, the camera 20 is positioned in front of the commodity shelf 40 so as to directly face the commodity shelf 40. The camera 20 may be arranged to capture the image of the commodity shelf 40 from an oblique angle. The position and direction in which the camera 20 is positioned are not limited to a specific configuration.

For example, the camera 20 is a CCD camera, or the like. The camera 20 may be provided with a light or the like for illuminating the commodity shelf 40. In addition, the electronic label system 1 may include lighting separated from the camera 20.

The electronic shelf label 31 displays information according to a signal from the display control device 10. As illustrated in FIG. 1, the electronic shelf label 31 is formed in a stripe shape.

The electronic shelf label 31 includes, for example, a controller and a display device. The controller drives the display device based on the signal from the display control device 10. The display device displays an image based on the signal from the controller. The display device is, for example, electronic paper or a liquid crystal panel.

A configuration of the electronic shelf label 32 is similar to that of the electronic shelf label 31, and the description thereof will be omitted.

The electronic shelf labels 31 and 32 may be controlled by the same controller. For example, the electronic shelf labels 31 and 32 may be connected to the controller.

The electronic shelf label 31 is formed so as to cover the front surface of the shelf 41. That is, the electronic shelf label 31 displays the information on the front surface of the shelf 41. The electronic shelf label 32 is formed so as to cover the front surface of the shelf 42. That is, the electronic shelf label 32 displays the information on the front surface of shelf 42.

The commodity shelf 40 may further include other shelves. For example, the commodity shelf 40 may include a vertical shelf or the like. In addition, the commodity shelf 40 may not include the shelves. The configuration of the commodity shelf 40 is not limited to a specific configuration.

In addition, the commodity shelf 40 may include a number of commodities different from four. The type and the number of commodities stored in the commodity shelf 40 are not limited to a specific configuration.

Next, the display control device 10 will be described.

Figure 2:
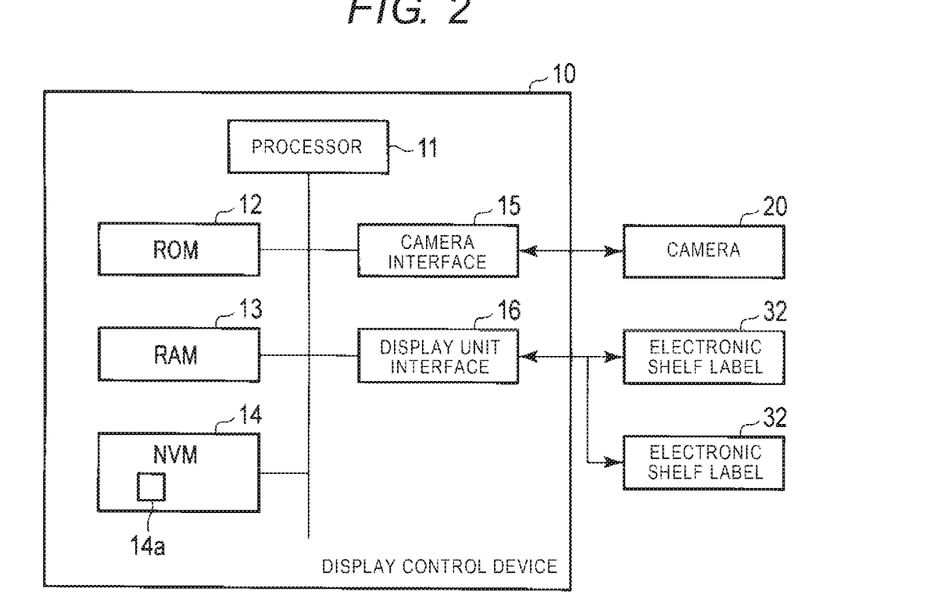
FIG. 2 is a block diagram illustrating an example configuration of a display control device according to a first embodiment.

FIG. 2 is a block diagram illustrating an example configuration of the display control device 10.

As illustrated in FIG. 2, the display control device 10 includes a processor 11, a ROM 12, a RAM 13, an NVM 14, a camera interface 15, and a display unit interface 16. The processor 11, the ROM 12, the RAM 13, the NVM 14, the camera interface 15 and the display unit interface 16 are connected to each other via a data bus. The display control device 10 may include elements in addition to the configuration illustrated in FIG. 2 if necessary, or may exclude specific elements.

The processor 11 has a function of controlling the overall operation of the display control device 10. The processor 11 may include an internal cache and various interfaces and the like. The processor 11 realizes various processing items by executing a program stored in an internal memory, in the ROM 12 or in the NVM 14 in advance. The processor 11 is, for example, a CPU.

A part or all of the various functions realized by the processor 11 executing the program may be realized by a hardware circuit. In this case, the processor 11 controls the function executed by the hardware circuit.

The ROM 12 is a non-volatile memory in which a control program and control data and the like are stored in advance. The control program and the control data stored in the ROM 12 are incorporated in advance according to the specification of the display control device 10. The ROM 12 stores, for example, a program (for example, BIOS) for controlling a circuit board of the display control device 10.

The RAM 13 is a non-volatile memory. The RAM 13 temporarily stores data or the like being processed by the processor 11. The RAM 13 stores various application programs based on commands from the processor 11. In addition, the RAM 13 may store the data necessary for executing the application program and the execution result of the application program.

The NVM 14 (a storage device) is a non-volatile memory that can write and rewrite data. The NVM 14 is configured with, for example, a hard disk, an SSD, an EEPROM, a flash memory, or the like. The NVM 14 stores the control program, applications, and various data items according to the operational usage of the display control device 10.

In addition, the NVM 14 includes a storage area 14*a* for storing a commodity information table and the like. The commodity information table will be described later.

The camera interface 15 (the first interface) is an interface for enabling the processor 11 to communicate with the camera 20. For example, the processor 11 transmits a signal through the camera interface 15 to cause the camera 20 to acquire an image. In addition, the processor 11 may set a camera parameter for capturing the image on the camera 20, through the camera interface 15.

In addition, the camera interface 15 acquires the image captured by the camera 20. The camera interface 15 transmits the acquired image to the processor 11. The processor 11 acquires the image captured by the camera 20 from the camera interface 15.

The display unit interface 16 (the second interface) is an interface for enabling the processor 11 to communicate with the electronic shelf labels 31 and 32. For example, the processor 11 transmits display information indicating the content and the like to be displayed on the electronic shelf labels 31 and 32 through the display unit interface 16.

The camera interface 15 and the display unit interface 16 may be integrally configured. For example, camera interface 15 and display unit interface 16 may support a wired or a wireless connection.

Next, the commodity information table will be described.

The commodity information table stores identification code and the commodity information in association with each other.

The identification code is a code specifying the commodity. The identification code is assigned to the commodity in advance. For example, the identification code is a numeric value, a character string, a symbol, or a combination thereof. The format of the identification code is not limited.

The commodity information is information on the commodity indicated by the corresponding identification code. For example, the commodity information includes information to be displayed on the electronic shelf label 31 or 32. For example, the commodity information is a name, a price or discount information of the commodity. The format of the commodity information is not limited to a specific configuration.

The storage area 14*a* of the NVM 14 stores the commodity information table in advance. For example, the processor 11 stores the commodity information table according to an operator's operation. In addition, the processor 11 may acquire the commodity information table from an external device through a communication interface or the like, and may store the information in the storage area 14*a*. In addition, the processor 11 may appropriately update the commodity information table.

Next, the functions realized by the processor 11 will be described.

First, the processor 11 has a function of acquiring an image (a captured image) of the commodity shelf 40 on which the commodities A to D are arranged.

For example, the processor 11 captures the image using the camera 20 according to the operator's operation. In addition, the processor 11 may capture the image using the camera 20 when the arrangement of the commodity on the commodity shelf 40 is finished, or the like.

For example, the processor 11 transmits a signal for capturing the image to the camera 20, and the camera 20 then captures the image of the commodity shelf 40. After transmitting the signal, the processor 11 acquires the captured image from the camera 20. The processor 11 may set the imaging parameter on the camera 20 for capturing the image.

The processor 11 may acquire a captured image from an external device.

In addition, the processor 11 has a function of identifying each commodity and the position of each commodity appearing in the captured image. Here, the processor 11 is assumed to determine the identification code of the commodity for identifying the commodity.

For example, for each commodity appearing in the captured image, the processor 11 identifies the commodity area where the commodity appears from the captured image. For example, the processor 11 may identify the commodity area based on a background color of the commodity shelf 40. In addition, the processor 11 may identify the commodity area by detecting an edge. The processor 11 identifies the position of the commodity area as the position of the commodity.

When the commodity area is identified, the processor 11 identifies the commodity that appears in the commodity area. For example, the identification code of the commodity is identified by matching a commodity image previously stored in the NVM 14 with the image of the commodity area.

The method for the processor 11 to identify the commodity and the position of the commodity is not limited to a specific configuration.

In addition, the processor 11 has a function of determining the electronic shelf label for displaying the commodity information of the commodity based on the position of the commodity. For example, the processor 11 determines any of the electronic shelf labels 31 or 32 as the electronic shelf label to display the commodity information.

For example, the processor 11 sets an area (an arrangement area) corresponding to each electronic shelf label in the captured image. For example, as an arrangement area of the electronic shelf label, the operator specifies the area for which the commodity information (corresponding to the commodity) is displayed on the electronic shelf label. For example, the processor 11 stores an area input by the operator in the NVM 14 as the arrangement area.

The processor 11 may set the arrangement area of each electronic shelf label referring to the NVM 14. In addition, the processor 11 may set the arrangement area of the electronic shelf label using the position and size of the electronic shelf label. The method for the processor 11 to set the arrangement area of the electronic shelf label is not limited to the specific method.

When the arrangement area is set, the processor 11 specifies the arrangement area including the position of the commodity. For example, the processor 11 may specify the arrangement area that includes all or part of the commodities. In addition, the processor 11 may specify the arrangement area including the center of gravity of the commodity area.

The processor 11 determines the particular electronic shelf label corresponding to the specified arrangement area as the electronic shelf label for displaying the commodity information of the commodity.

Figure 3:
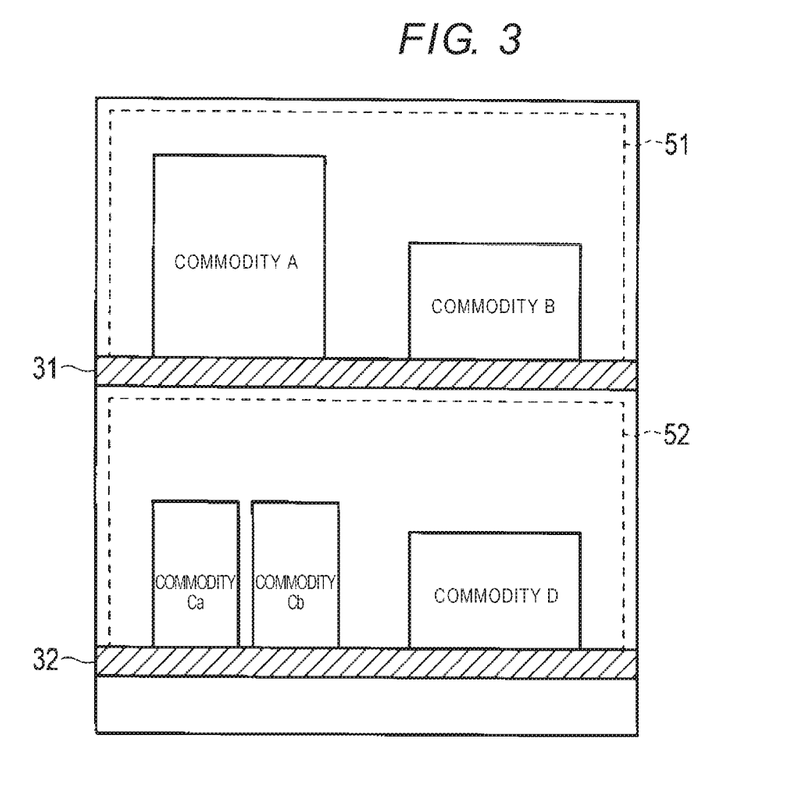
FIG. 3 is a diagram illustrating a captured image used by the display control device in the first embodiment.

FIG. 3 is a diagram for explaining an operation in which the processor 11 determines the electronic shelf label.

FIG. 3 is the captured image acquired by the processor 11. The processor 11 sets the arrangement range 51 and the arrangement range 52 in the captured image.

The arrangement range 51 is an area corresponding to the electronic shelf label 31. In addition, the arrangement range 52 is an area corresponding to the electronic shelf label 32.

For example, it is assumed that the processor 11 identifies the commodity A and the position of the commodity A. The processor 11 determines in which of the arrangement area among the arrangement areas 51 or 52 of the electronic shelf label the position of the commodity A is included. In this case, the processor 11 determines that the position of the commodity A is included in the arrangement area 51. Therefore, the processor 11 identifies the arrangement area 51 as the arrangement area that includes the position of the commodity A. Therefore, the processor 11 determines the electronic shelf label 31 corresponding to the arrangement area 51 as the electronic shelf label that displays the commodity information of the commodity A.

Similarly, the processor 11 determines the electronic shelf label 31 as the electronic shelf label that displays the commodity information of commodity B. In addition, the processor 11 determines the electronic shelf label 32 as the electronic shelf label that displays commodity information of the commodity C and the commodity D.

The processor 11 may output an error message when the position of the commodity is not included in the arrangement area of both the electronic shelf labels. For example, the processor 11 outputs the error message through an interface connected to the display unit for displaying an error message or through an interface connected to a speaker.

In addition, the processor 11 has a function of determining a display position for displaying the commodity information of the specified commodity in the determined electronic shelf label.

For example, the processor 11 acquires the coordinates of both ends of the determined electronic shelf label (coordinates of a left end and coordinates of a right end). For example, the NVM 14 stores the coordinates of both ends of each electronic shelf label, and the processor 11 acquires the coordinates of both ends of the electronic shelf label from the NVM 14.

In addition, the electronic shelf label may display markers (a one-dimensional code, a two-dimensional code, a predetermined texture, a character string, a numerical value, a symbol or a combination thereof) indicating the coordinates of both ends. The processor 11 may read the marker and acquire the coordinates of both ends of the electronic shelf label.

The processor 11 determines the display position based on the coordinates of both ends of the electronic shelf label. For example, the processor 11 acquires the barycentric coordinates of the commodity area in which the commodity is specified. The processor 11 determines the display position below the acquired barycentric coordinates. For example, the processor 11 determines the display position such that the center of the commodity information displayed on the electronic shelf label coincides with the horizontal direction coordinates of the barycentric coordinates.

For example, the processor 11 calculates the display position (coordinate x indicating the display position in the horizontal direction) according to following Expression.

$$x=(g-p1)/(p2-p1)\times w \quad (1)$$

Here, g indicates the barycentric coordinates, p1 indicates the coordinates of left end, p2 indicates the coordinates of right end, and w indicates a displayable width of the electronic shelf label.

Figure 4:
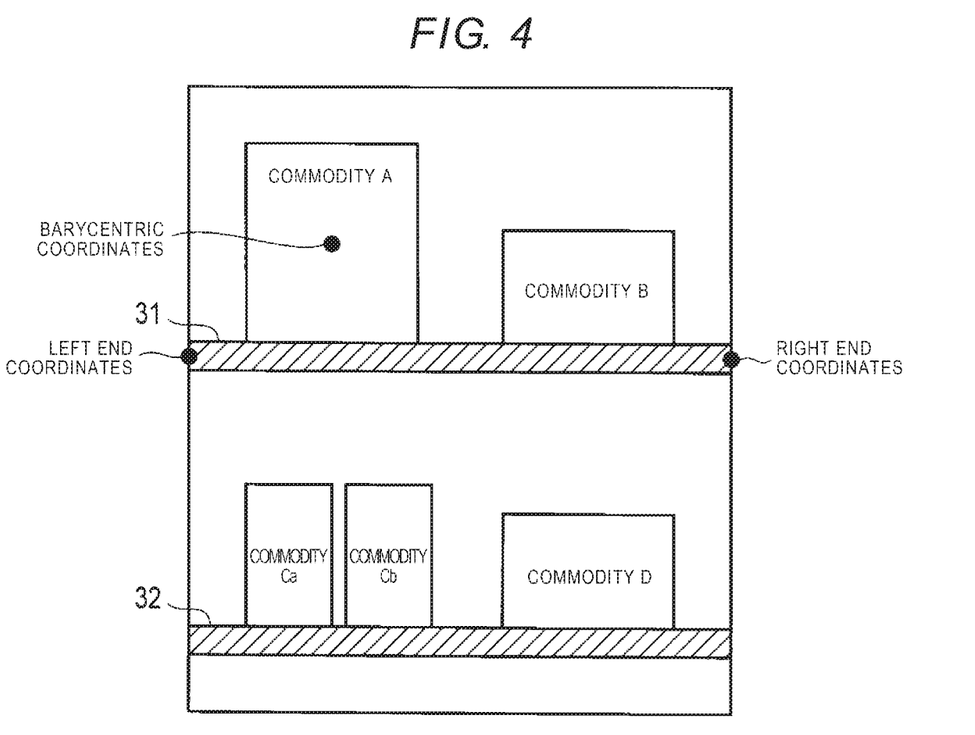
FIG. 4 is a diagram illustrating another captured image used by the display control device in the first embodiment.

FIG. 4 is a diagram for explaining an operation example in which the processor 11 determines the display position.

FIG. 4 illustrates a captured image. Here, it is assumed that the processor 11 determines the display position for displaying the commodity information of the commodity A.

As illustrated in FIG. 4, the processor 11 acquires the coordinates of left end and the coordinates of right end of the electronic shelf label 31. In addition, the processor 11 acquires the barycentric coordinates of the commodity area of the commodity A. The processor 11 substitutes the coordinates of the left end, the coordinates of the right end and the displayable width of electronic shelf label 31, and the barycentric coordinates into Expression (1), and then, calculates the display position.

In addition, the processor 11 has a function of acquiring the commodity information corresponding to the recognized commodity.

For example, the processor 11 acquires the commodity information corresponding to the identified identification code by referring to the commodity information table.

In addition, the processor 11 has a function of storing display data in which the identification code, the acquired commodity information, the determined electronic shelf label, and the determined display position are associated with each other.

For example, the processor 11 generates the display data and stores the data in the NVM 14 or the like.

In addition, the processor 11 has a function of generating display data for each of a plurality of identified commodities when a plurality of the same commodities is identified from the captured image. For example, the processor 11 determines one display position for a plurality of the same identified commodity.

For example, when the processor 11 recognizes a plurality of the same commodities in the same area, the processor 11 generates one display data for the plurality of commodities.

For example, it is assumed that the processor 11 identifies the identification code of another commodity (a second commodity) after storing the display data of a first commodity, and then, determines the electronic shelf label. Here, it is assumed that the identification code and the electronic shelf label corresponding to the first commodity is the same as the identification code and the electronic shelf label corresponding to the second commodity.

When the electronic shelf label of the second commodity is determined, the processor 11 searches the NVM 14 for the display data having the same identification code as the identification code of the second commodity and having the same electronic shelf label as the electronic shelf label of the first commodity. That is, the processor 11 searches for the display data corresponding to the same commodity and the same electronic shelf label.

When the display data for the same identification code and the same electronic shelf label is found, the processor 11 finds the display data for the first commodity. When the display data for the first commodity is found, the processor 11 determines the display position based on the position of the first commodity corresponding to the display data and the position of the second commodity.

For example, the processor 11 determines the display position such that the commodity information is displayed below the average value of a position of the center of gravity of the first commodity and a position of the center of gravity of the second commodity. For example, the processor 11 calculates the display position by substituting the average value in Expression (1) as the position of the center of gravity.

When the display position is calculated, the processor 11 generates the display data for which the identification code, the commodity information, and the newly determined display position are associated with each other, and then, stores the display data in the NVM 14. The processor 11 may use the commodity information of the display data corresponding to the first commodity as the commodity information. In addition, the processor 11 may acquire the commodity information of the second commodity from the commodity information table and may acquire the commodity information from the commodity information.

When the new display data is stored in the NVM 14, the processor 11 deletes the previous display data corresponding to the first commodity.

The processor 11 may update the display position of the display data corresponding to the first commodity to the newly determined display position without generating new display data.

When three or more of the same commodities are recognized in the same area, the processor 11 may determine a new display position based on the position of the center of gravity of each commodity. For example, processor 11 may determine the new display position based on the average value of the position of the center of gravity for each commodity.

Figure 5:
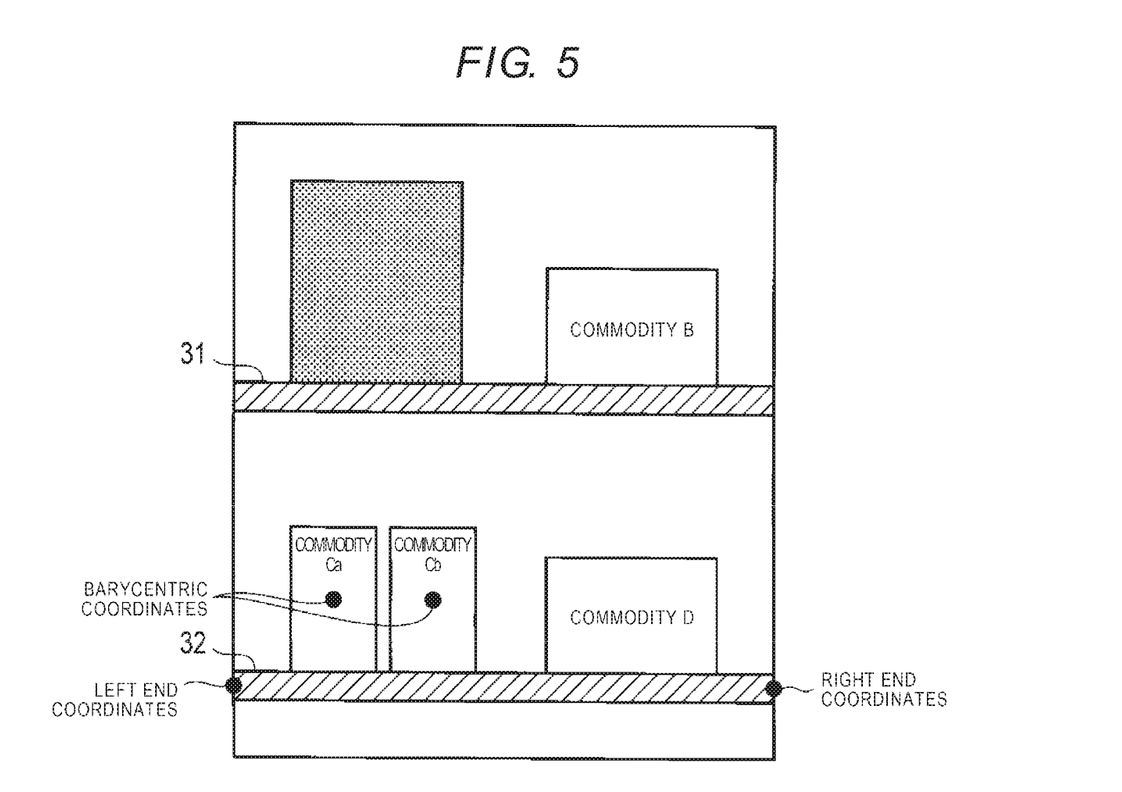
FIG. 5 is a diagram illustrating another example of a captured image used by the display control device in the first embodiment.

FIG. 5 is a diagram for explaining an operation example in which the processor 11 determines the display positions of a plurality of same commodities.

FIG. 5 illustrates a captured image. Here, it is assumed that the processor 11 identifies the commodity A. The processor 11 masks the commodity area of the recognized commodity A in the captured image.

Next, it is assumed that the processor 11 identifies the commodity Ca. The processor 11 stores the identification code corresponding to commodity Ca (e.g., the identification code of the commodity C), the commodity information, the electronic shelf label 32 (the information indicating the electronic shelf label 32), and the display data with which the display position is associated, in the NVM 14.

When the display data is stored, the processor 11 identifies commodity Cb. When the commodity Cb is identified and the identification code of the commodity C is identified, the processor 11 determines that the electronic shelf label 32 is the electronic shelf label displaying the commodity information of the commodity Cb. When the electronic shelf label 32 is determined, the processor 11 searches the NVM 14 for the display data having the same identification code and the electronic shelf label. Here, the processor 11 searches the NVM 14 for the display data which stores the identification code indicating the commodity C and the electronic shelf label 32.

The processor 11 finds the display data corresponding to the commodity Ca as a result of the search. When the display data corresponding to the commodity Ca is found, the processor 11 determines the display position based on the average value of the barycentric coordinates of the commodity area of the commodity Ca and the barycentric coordinates of the commodity area of the commodity Cb. When the display position is determined, the processor 11 generates the display data in which the identification code of the commodity C, the commodity information of the commodity C, the electronic shelf label 32, and the determined display position are associated with other, and then, stores the display data in the NVM 14. When the new display data is stored, the processor 11 deletes the previous display data corresponding to the commodity Ca.

In addition, the processor 11 has a function of generating display information based on the display data.

The display information indicates the commodity information and the display position to be displayed in the electronic shelf labels 31 and 32. The display information may indicate the display width. For example, the processor 11 generates the display information that stores the display data.

In addition, the processor 11 may check whether or not the display data items interfere with each other. For example, the NVM 14 stores the display width of each display information. When displaying a plurality of display data items on the electronic shelf labels 31 or 32, the processor 11 determines whether or not the displays overlap each other based on the display width and the display position of each display information.

When it is determined that the displays overlap each other, the processor 11 may adjust the display position of the display data which overlaps. In addition, the processor 11 may adjust the display width of the display data which overlaps.

In addition, the processor 11 may generate the display information corresponding to each of the electronic shelf labels 31 and 32.

In addition, the processor 11 has a function of transmitting the display information to the electronic shelf labels 31 and 32 through the display unit interface 16.

When the display information corresponding to the electronic shelf labels 31 and 32 is generated respectively, the processor 11 may transmit the display information corresponding to each of the electronic shelf labels 31 and 32.

Next, an operation example of the processor 11 will be described.

Figure 6:
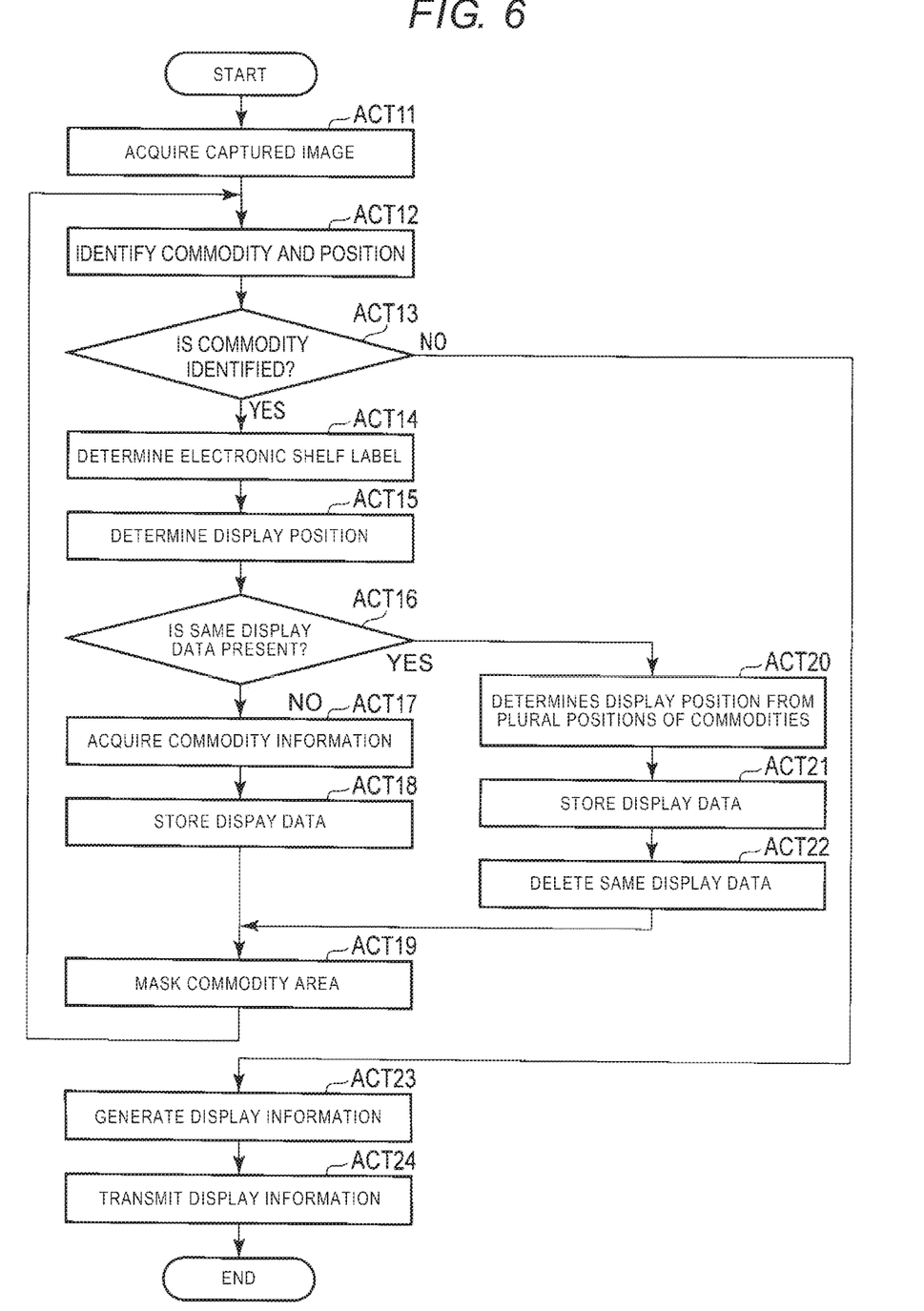
FIG. 6 is a flowchart illustrating an example sequence of operations of the display control device.

FIG. 6 is a flowchart illustrating an operation example of the processor 11.

First, the processor 11 acquires the captured image using the camera 20 (Act 11). When the captured image is acquired, the processor 11 identifies the commodity identification code and the position of the commodity from the captured image (Act 12). When the identification code of commodity and the position of the commodity are identified (YES in Act 13), the processor 11 determines the electronic shelf label that displays the display information of the commodity based on the position of the commodity (Act 14).

When the electronic shelf label is identified, the processor 11 determines the display position for displaying the commodity information (Act 15). When the display position is determined, the processor 11 determines whether or not the display data having the identification code specified in Act 12 and the electronic shelf label determined in Act 14 is present (Act 16).

When it is determined that the display data having the identification code specified in Act 12 and the electronic shelf label determined in Act 14 is not present (NO in Act 16), the processor 11 acquires the commodity information corresponding to the identification code (Act 17). When the commodity information is acquired, the processor 11 generates the display data in which the identification code identified in Act 12, the commodity information acquired in Act 17, the electronic shelf label determined in Act 14, and the display position identified in Act 15 are associated with each other, and then, stores the display data in the NVM 14 (Act 18).

When the display data is stored, the processor 11 masks the commodity area of the commodity specified in Act 12 in the captured image (Act 19). When the commodity area is masked, the processor 11 returns the process to Act 12.

When it is determined that the display data having the identification code specified in Act 12 and the electronic shelf label determined in Act 14 is present (YES in Act 16), the processor 11 determines the display position based on the position of the commodity corresponding to the display data and the position of the commodity specified in Act 12 (Act 20).

When the display position is determined, the processor 11 generates the display data based on the display position, and then, stores the display data in the NVM 14 (Act 21). When the display data is stored, the processor 11 deletes the display data determined to be present in Act 16 (Act 22). When the display data is deleted, the processor 11 causes the process to proceed to Act 19.

When it is determined that the commodity and the position of the commodity cannot be identified (that is, when it is determined that no commodities are present in the captured image, e.g., all commodity areas are masked) (NO in Act 13), the processor 11 generates the display information from the display data (Act 23). When the display information is generated, the processor 11 transmits the generated display information to the electronic shelf labels 31 and 32 (Act 24). When the display information is transmitted, the processor 11 ends the operation.

The electronic shelf labels 31 and 32 receive the display information from the processor 11. When the display information is received, the electronic shelf labels 31 and 32 display the commodity information based on the display information.

The processor 11 may generate the display information which displays a part of the commodity information.

In addition, the electronic label system 1 may include a projector that displays the image in a predetermined area instead of the electronic shelf labels 31 and 32. The projector may be, for example, a projector having front surfaces of the shelves 41 and 42 as projection surfaces, or a projector incorporated in the transmission type shelf. The processor 11 transmits the display information to the projector.

The electronic label system configured as described above acquires the image of the commodity shelf on which the commodities are arranged. The electronic label system specifies the commodity and the position of the commodity from the acquired image. The electronic label system determines the electronic shelf label that displays the commodity information and the display position on the electronic shelf label based on the position of the commodity. In addition, the electronic label system acquires the commodity information displayed on the electronic shelf label based on the commodity. Therefore, the electronic label system can determine the display content and the display position to display on the electronic shelf label from the image. Therefore, the electronic label system can effectively control the display.

Second Embodiment

Next, the second embodiment will be described.

The electronic label system 1' according to the second embodiment is different from the electronic label system in the first embodiment in that an electronic shelf label is formed in the shelves 41 and 42 respectively. Therefore, the same reference numerals will be given the other configuration elements, and the detailed description thereof will be omitted.

Figure 7:
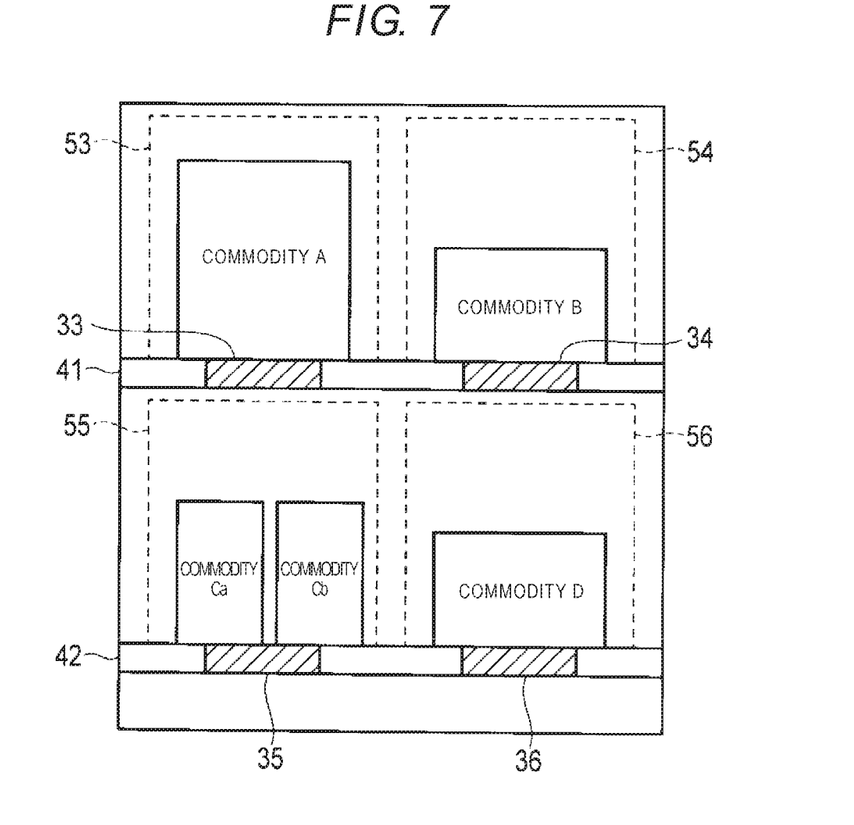
FIG. 7 is a diagram illustrating an example of a captured image used by a display control device in a second embodiment.

FIG. 7 illustrates a captured image of the commodity shelf 40.

As illustrated in FIG. 7, the electronic label system 1' includes electronic shelf labels 33 to 36.

The electronic shelf labels 33 and 34 are formed on the front surface of the shelf 41. The electronic shelf label 33 is formed at a predetermined distance from the left end of the shelf 41. The electronic shelf label 34 is formed at a predetermined distance from the right end of the electronic shelf label 33.

The electronic shelf labels 35 and 36 are formed on the front surface of the shelf 42. The electronic shelf label 35 is formed at a predetermined distance from the left end of the shelf 42. The electronic shelf label 36 is formed at a predetermined distance from the right end of the electronic shelf label 35.

The electronic shelf labels 33 to 36 each display commodity information for one commodity. For example, the electronic shelf labels 33 to 36 have a predetermined width to display commodity information for one commodity.

Next, the arrangement area set by the processor 11 will be described.

As illustrated in FIG. 7, the processor 11 sets the arrangement area 53 to 56.

The arrangement area 53 to 56 correspond to the electronic shelf labels 33 to 36, respectively.

In the example illustrated n FIG. 7, the arrangement areas 53 to 56 are predetermined areas above the electronic shelf labels 33 to 36.

The commodities A to D are included in the arrangement areas 53 to 56, respectively. Therefore, the processor 11 determines the electronic shelf labels 33 to 36 as the electronic shelf labels that display the commodity information of the commodity A to the commodity D.

The processor 11 has a function of generating the display data in which the identification code, the commodity information, and the electronic shelf label are associated with each other.

For example, the processor 11 generates the display data and stores the display data in the NVM 14 or the like.

The processor 11 may not determine the display position. The display data may not include the display position.

Similar to the first embodiment, the processor 11 generates the display information from the display data. The processor 11 transmits the generated display information to the electronic shelf labels 33 to 36.

The electronic shelf labels 33 to 36 receive the display information. When the display information is received, each of the electronic shelf labels 33 to 36 displays the commodity information based on the display information.

The electronic label system configured as described above has a plurality of electronic shelf labels, each for displaying commodity information corresponding to one commodity. Therefore, if the electronic shelf label that displays the commodity information of the specified commodity is determined, the electronic label system can display the commodity information on the electronic shelf label without determining the display position.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control device for controlling an electronic label in an electronic label system, wherein the electronic label has a stripe shape and extends between right and left ends of a shelf on which the first and second commodities are displayed, the device comprising:
   a first interface by which a captured image is acquired;
   a second interface by which display information is transmitted to the electronic label; and
   a processor configured to:
      identify first and second commodities in the captured image and a position of the first commodity and a position of the second commodity in the captured image,
      determine a first display position on the electronic label for displaying first commodity information relating to the first commodity based on the determined position of the first commodity, and a second display position on the electronic label for displaying second commodity information relating to the second commodity based on the determined position of the second commodity,
      generate the display information including the first and second commodity information and the first and second display positions, and
      transmit the generated display information to the electronic label via the second interface.

2. The device according to claim 1, further comprising:
   a storage device that stores a commodity information table associating first and second identification codes with the first and second commodity information,
   wherein the processor is further configured to:
      acquire the first and second identification codes of the identified first and second commodities, and
      retrieve the first and second commodity information associated with the acquired first and second identification codes from the commodity information table.

3. The device according to claim 2, wherein the processor is further configured to determine whether display data corresponding to the determined display position of the first or second commodity is present in the storage device, wherein
   if the display data corresponding to the determined display position is present in the storage device, the processor generates the display information based on the stored display data corresponding to the determined display position.

4. The device according to claim 1, wherein the processor is further configured to:
   identify first and second arrangement areas in the received captured image in which the identified first and second commodities are positioned, after determining the first and second display positions, mask the arrangement areas in the received captured image, and after masking the arrangement areas, identify an additional commodity, if any, in the received captured image.

5. The control device according to claim 1, wherein the processor determines the first and second display positions based on coordinates of the identified first and second commodities and right and left edges of the electronic label in the captured image.

6. The device according to claim 1, wherein the first and second display positions are positions on a single electronic label.

7. A method for controlling an electronic label in an electronic label system, the method comprising:

acquiring a captured image in which first and second commodities are included;

identifying the first and second commodities in the captured image and a position of the first commodity and a position of the second commodity in the captured image;

determining a first display position on the electronic label for displaying first commodity information relating to the first commodity based on the determined position of the first commodity, and a second display position on the electronic label for displaying second commodity information relating to the second commodity based on the determined position of the second commodity, the electronic label having a stripe shape and extending between right and left ends of a shelf on which the first and second commodities are displayed;

generating display information including the first and second commodity information and the first and second display positions; and transmitting the generated display information to the electronic label.

8. The method according to claim 7, further comprising:

storing, in a storage device, a commodity information table associating first and second identification codes with the first and second commodity information, wherein identifying the commodity includes:

acquiring the first and second identification codes of the identified first and second commodities, and retrieving the first and second commodity information associated with the acquired first and second identification codes from the commodity information table.

9. The method according to claim 8, further comprising:

determining whether display data corresponding to the determined display position of the first or second commodity is present in the storage device, wherein if the display data corresponding to the determined display position is present in the storage device, the display information is generated based on the stored display data corresponding to the determined display position.

10. The method according to claim 7, further comprising:

identifying first and second arrangement areas in the captured image in which the identified first and second commodities are positioned;

after determining the first and second display positions, masking the arrangement areas in the received captured image; and after masking the arrangement areas, identifying an additional commodity, if any, in the received captured image.

11. The method according to claim 7, wherein the first and second display positions are determined based on coordinates of the identified first and second commodities and right and left edges of the electronic label in the captured image.

12. The method of claim 7, further comprising:

displaying the first commodity information and the second commodity information respectively at the first display position and the second display position on the electronic label that extends between the right and left ends of the shelf.

13. The method according to claim 7, wherein the first and second display positions are positions on a single electronic label.

14. An electronic label system comprising:

at least one electronic label provided on a shelf on which first and second commodities are displayed, the electronic label having a stripe shape and extending between right and left ends of the shelf on which the first and second commodities are displayed; and a control device including a first interface by which a captured image including the shelf and the first and second commodities is acquired, a second interface by which display information is transmitted to the electronic label, and a processor configured to:

identify first and second commodities in the captured image and a position of the first commodity and a position of the second commodity in the captured image, determine a first display position on the electronic label for displaying first commodity information relating to the first commodity based on the determined position of the first commodity and a second display position on the electronic label for displaying second commodity information relating to the second commodity based on the determined position of the second commodity, generate the display information including the first and second commodity information and the first and second display positions, and transmit the generated display information to the electronic label via the second interface.

15. The system according to claim 14, wherein the control device further includes a storage device that stores a commodity information table associating first and second identification codes with the first and second commodity information, and the processor is further configured to:

acquire the first and second identification codes of the identified first and second commodities, and retrieve the first and second commodity information associated with the acquired first and second identification codes from the commodity information table.

16. The system according to claim 15, wherein the processor is further configured to determine whether display data corresponding to the determined display position of the first or second commodity is present in the storage device, wherein if the display data corresponding to the determined display position is present in the storage device, the processor generates the display information based on the stored display data corresponding to the determined display position.

17. The system according to claim 14, wherein the processor determines the first and second display positions based on coordinates of the identified first and second commodities and right and left edges of the electronic label in the captured image.

18. The system according to claim 14, wherein the first and second display positions are positions on a single electronic label.

* * * * *